Nov. 16, 1965     L. STEIN ETAL     3,218,232
METHOD FOR RELIEVING DEPRESSION AND COMPOSITION THEREFOR
Filed Nov. 9, 1962     2 Sheets-Sheet 1
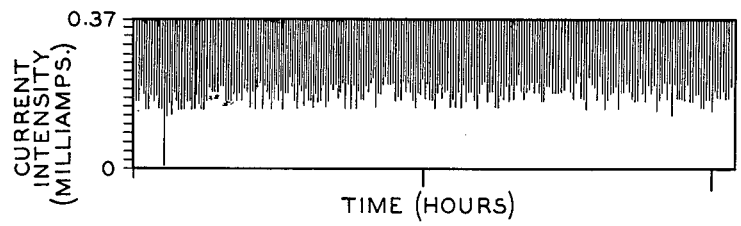
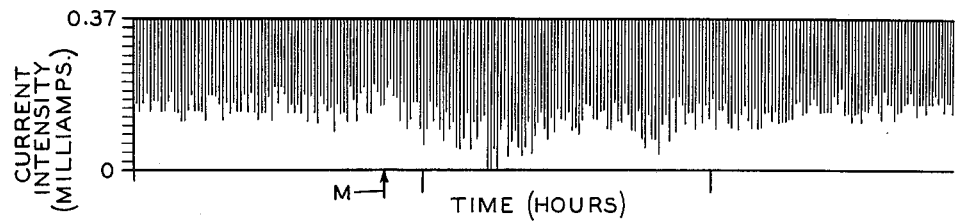
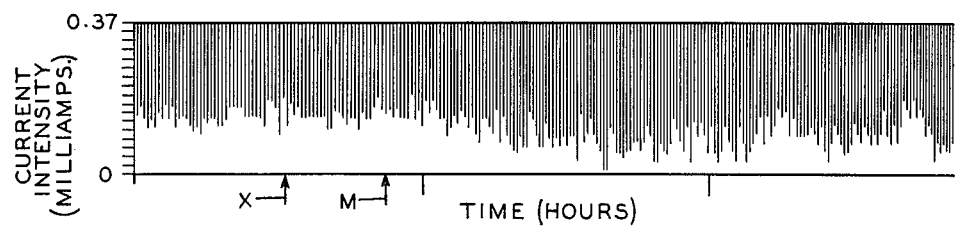
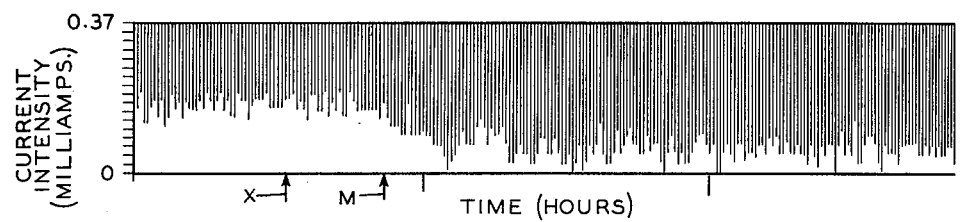
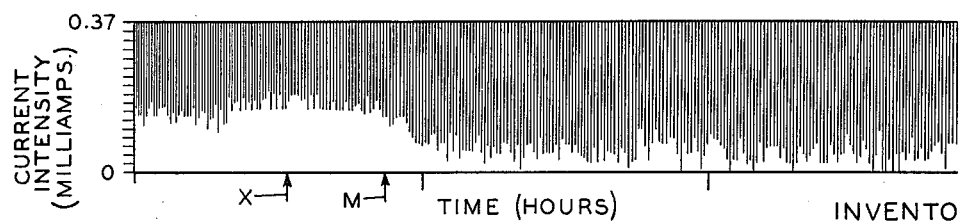
INVENTORS:
LARRY STEIN
SCOTT J. CHILDRESS
BY
ATTORNEY Nov. 16, 1965   L. STEIN ETAL   3,218,232
METHOD FOR RELIEVING DEPRESSION AND COMPOSITION THEREFOR
Filed Nov. 9, 1962   2 Sheets-Sheet 2
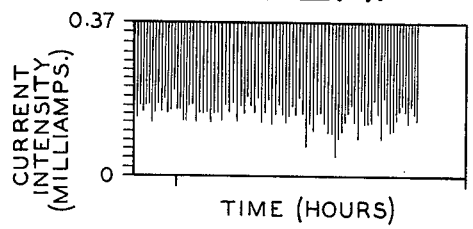
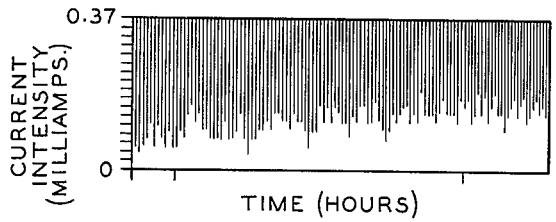
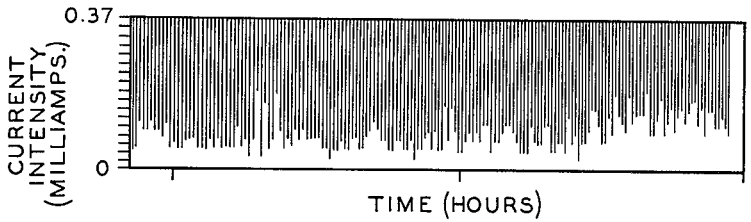
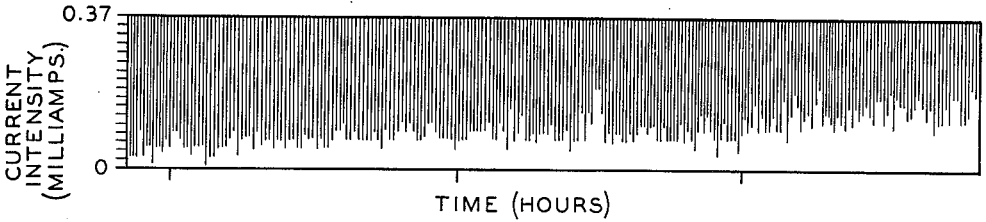
INVENTORS:
LARRY STEIN
SCOTT J. CHILDRESS
BY
ATTORNEY 3,218,232
METHOD FOR RELIEVING DEPRESSION
AND COMPOSITION THEREFOR
Larry Stein, Belmont Hills, and Scott J. Childress, Newtown Square, Pa., assignors to American Home Products Corporation, New York, N.Y., a corporation of Delaware
Filed Nov. 9, 1962, Ser. No. 236,551
3 Claims. (Cl. 167—65)

The present invention relates in general to therapeutic compositions useful in the treatment of depression in humans. More specifically, the invention relates to compositions of matter including certain substituted derivatives of phenothiazine 5-monoxide or corresponding 5,5-dioxides, which have been quite unexpectedly discovered to exhibit pharmacological activity in the elevation of the mood and activity of depressed patients. The administration of our novel therapeutic composition will therefore induce in such subjects a feeling of happiness and well-being and restore normal behavior with relatively minor sedative effect.

The field of variously substituted phenothiazines has been widely investigated in recent years, with the result that a large variety of useful therapeutic properties have been discovered for the broad class of compounds of this type. Their most important utilities from a scientific and pharmaceutical standpoint have been their utilities as tranquilizing, sedative, antiemetic, ataractic, and antihistaminic agents. However, nothing has been discovered or reported which would indicate that any member of the phenothiazine oxide family of compounds, no matter how substituted, would exert any appreciable effect upon the central nervous system of animals or humans. To the contrary, we have now found that with the employment of certain selected members of the substituted phenothiazine oxide class more particularly detailed hereinbelow, a quite satisfactory antidepressant effect or mood elevation without adverse side effects can be achieved.

The invention sought to be patented in its composition aspect therefore resides in the concept of, and therapeutic application to selected subjects of, a chemical compound characterized by having a molecular structure comprising a phenothiazine nucleus having attached to the nitrogen atom in the 10-position an amino type functional group such as, for instance, a dialkylamino alkyl group; attached to the sulfur atom in the 5-position one or two oxygen atoms and in some cases attached to a ring carbon a halogen atom or its hereinafter disclosed equivalent. The compounds which are employed as active ingredients in our novel therapeutic compositions may therefore be represented at least in part by the general formula:

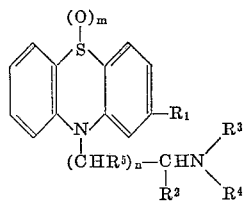

and the acid addition salts thereof with pharmaceutically acceptable acids; wherein $R^1$ represents a substituent such as hydrogen, a halogen atom such as chlorine and the like, a trifluoromethyl group, or alternatively a lower alkanoyl group of not more than about 4 carbon atoms such as acetyl, propionyl or the like; $n$ and $m$ each represent either one or two; $R^2$, $R^3$, $R^4$, and $R^5$ each represent either hydrogen or a lower alkyl group. If desired, $R^2$ and $R^3$ can be ring closed to form a heterocyclic ring structure containing a nitrogen atom therein, and therefore would represent a functional group such as a piperidine or pyrrolidine.

In a second composition aspect the above identified compound may be combined with amphetamine or one of its centrally stimulating congeners. In this particular aspect we have found these compositions of our second composition aspect give more profound and rapid response in certain types of depressed patients.

The term "lower alkyl" as employed here includes both straight and branched chain alkyl radicals of less than about seven carbon atoms. The particularly preferred compounds are those wherein $m$ equals one, $n$ equals one, $R^1$ and $R^5$ are hydrogen, and $R^2$, $R^3$, and $R^4$ are methyl.

As to the pharmaceutically acceptable salts of these compounds, those coming within the purview of the invention include the acid addition salts, particularly the non-toxic acid addition salts. Acids useful for preparing the acid addition salts include, inter alia, inorganic acids such as the hydrohalic acids, i.e., hydrochloric and hydrobromic acid, sulfuric acid, nitric acid, and phosphoric acid, and organic acids or compounds capable of forming addition salts such as oxalic, tartaric, citric, acetic, maleic, and succinic acids.

The compounds utilized as the active ingredients in our novel therapeutic compositions may be either prepared or obtained as the corresponding 5-monoxide or 5,5-dioxide. To prepare the 5-monoxide, the corresponding 10-substituted phenothiazine, preferably in the form of its acid addition salt, is treated with an equivalent amount of an oxidizing agent such as hydrogen peroxide in a solvent such as ethanol, usually at reflux temperature. Use of acetic acid as a solvent results in the production of a 5,5-dioxide. Alternatively, one may treat a 10-haloalklyphenothiazine in a similar manner, recovering the 10-haloalkylphenothiazine 5-oxide or 5,5-dioxide so formed, and subsequently causing it to react with ammonia, a primary amine, or a secondary amine by heating the reactants together and recovering the product formed.

The invention sought to be patented in the process aspect may be described as residing in the concept of administering the tangible embodiment of a composition of matter comprising the essential active ingredient, generally as described above, either alone or in concert with other ingredients to form a pharmaceutical formulation which is administered to mammals, including human beings, as a means of therapy to induce an antidepressant effect therein.

The substituted phenothiazine oxide derivatives, or their pharmaceutically acceptable non-toxic acid addition salts, may be administered therefore to humans and animals by the conventional methods, the conventional types of unit dosages, or with the conventional pharmaceutical carriers to produce a therapeutic effect such as that pharmacological activity mentioned above, i.e., antidepressant activity. Oral administration by the use of tablets, capsules, or in liquid form such as suspensions, solutions, or emulsions is preferred. When formed into tablets, the conventional binding and disintegrating agents used in therapeutic unit dosages can be employed. Illustrative of such binding agents there can be mentioned glucose, lactose, gelatin, mannitol, starch paste, magnesium stearate, magnesium silicate, and talc. Illustrative of disintegrating agents there can be noted corn starch, keratin, colloidal silica, potato starch, and the like.

The therapeutically effective quantity or unit dosage of the substituted phenothiazine 5-oxides and dioxides for human beings for the therapeutic uses of the invention can vary over wide limits, such as from about 5 to about 200 milligrams. For oral administration it is preferred to employ from about 10 to about 50 milligrams per unit dose. The drug may be administered orally, parenterally, etc., in one or a plurality of applications daily. Of course, the dosage of the particular therapeutic agent used can vary considerably in relation to the age of the patient and the degree of therapeutic effect desired. Each unit dosage form of the novel therapeutic composition can contain from about 0.1% to 80% and preferably from about 0.5% to 20% of the novel therapeutic agent by weight of the entire composition with the remainder comprising various pharmaceutical carriers. By the term pharmaceutical carriers we intend to include non-therapeutic materials which are conventionally used in unit dosage forms and thus include various fillers, diluents, binders, lubricants, disintegrating agents and solvents. It is, of course, to be understood that the novel therapeutics, i.e., the pure compounds (or their acid addition salts) can be administered without the admixture of a pharmaceutical carrier if desired.

The therapeutic agents of the invention can be administered either prior to or after the onset of the condition to be treated. In this respect they are employed as a thymoleptic agent specific in the treatment of depression which induces a return to normal. It is beneficial in profound depressions of long standing, having little or no effect on other psychotic or neurotic symptoms. Its indications therefore would be in treatment of periodic endogenous depression, depressive phase of manic-depressive disease, involutional melancholia, reactive depression, senile depression, as well as depression associated with organic causes such as cerebral arteriosclerosis, parkinsonism, as well as psychiatric disorders like schizophrenia, alcoholism, mental deficiency, and the like disorders.

Various pharmacologic procedures were carried out in test animals to evaluate the antidepressant activity of these novel therapeutic agents. A first method, which is more particularly described in Example 5 below, refers to a Self-Stimulation Test series, which indicates the antidepressant potency of the drug in test animals as compared with known commercial antidepressant drugs presently available. A second test, described particularly in Example 6 below, and whose results are depicted in FIGURE 1 of the drawing, may be referred to as the Threshold Test. In this test, referring to the drawing, we see in FIG. 1 of the schematic representations the result of a kymograph record of threshold stimuli indicated by the jagged black line at about 0.18 mg. of the kymograph scale. This control shows the no drug baseline of reset of reward brain shocks. The relative desirable antidepressive effect of drugs on the test animal is indicated in the examples by the relatively lower current levels before reset which the animal will tolerate. By this control standard, therefore, a lower kymograph line than the baseline indicates a relatively effective antidepressive activity. By comparison with the no drug baseline, therefore, one can observe the relative effect of various test drugs as represented by the various plates in the drawing. The results presented on rat A63 shown in the drawing are representative of data gathered from twelve test animals (rats).

In addition to the test data set forth herein, tests designed to indicate the inhibition of self-stimulation, i.e., tranquilizing effect, at high dosage levels show that contrary to the effect of the commercial compound 5-(3-dimethylaminopropyl) - 10,11 - dihydro-5H-dibenz[b,f]azepine hydrochloride, for example, the compounds of our invention at 90 mg./kg. had no inhibiting effect on self-stimulation, while the compound referred to inhibits at a level as low as 30 mg. per kilogram of body weight.

The invention may be further illustrated by the following concrete embodiments of the invention in its product aspect, as illustrated by the examples of suitable therapeutic compositions in unit dosage form. Moreover, it is illustrated in its process aspect by administration to groups of test animals and to human beings by an example of clinical evaluation of the composition. It should be borne in mind that the purpose of all these examples is purely exemplary and not to be construed as limiting of the inventive concept.

EXAMPLE 1

*Tablet formulation*

The following formulation provides for the manufacture of 1000 tablets containing the therapeutic agent of the invention.

| Ingredients: | Grams |
|---|---|
| (1) 10-(2-dimethylaminopropyl) phenothiazine 5-oxide hydrochloride | 15.0 |
| (2) Methylcellulose | 15.0 |
| (3) Lactose U.S.P. | 25.0 |
| (4) Corn starch redried | 25.0 |
| (5) Magnesium stearate | 4.0 |
| (6) Microcel C | q.s. |
| | 250.0 |

Thoroughly mix the active ingredient (1), methylcellulose, lactose, corn starch, Microcel C, and one-half the amount of magnesium stearate. Predensify the mixture by "slugging" on a suitable tablet press. Pass the "slugged" material through a No. 16–20 mesh screen. Add the balance of the magnesium stearate, and mix well. Compress into tablets of 250 mg. each for oral administration.

EXAMPLE 2

*Capsule formulation*

The following formulation provides for the manufacture of 1000 capsules.

| Ingredient: | Grams |
|---|---|
| (1) 10-(3-dimethylaminopropyl) phenothiazine 5-oxide hydrochloride | 15.0 |
| (2) Magnesium stearate | 15.0 |
| (3) Lactose U.S.P. | 350.0 |

Mix the active ingredient (1) with the lactose and magnesium stearate. Blend well, and encapsulate at 380 mg. net fill.

EXAMPLE 3

*Oral suspension*

| Ingredients: | Milligrams |
|---|---|
| (1) 10-(3-dimethylaminopropyl)phenothiazine 5,5-dioxide hydrochloride | 15.0 |
| (2) Veegum | 37.5 |
| (3) Carboxymethylcellulose | 37.5 |
| (4) Tween 20 | 50.0 |
| (5) Glycerine | 250.0 |
| (6) Sucrose | 2000.0 |
| (7) Methyl parabenzoic acid | 5.0 |
| (8) Propyl parabenzoic acid | 1.0 |
| (9) Distilled water, color and flavor q.s. ad _____ml | 5.0 |

Hydrate the Veegum and carboxymethylcellulose in 40% of the distilled water, using a suitable mixer. Add the glycerine and the Tween 20, and mix well. Add and dissolve the methyl parabenzoic acid, propyl parabenzoic acid, and the sucrose. Disperse the active ingredient (1), using a suitable homogenizer to yield a uniform suspension. Add sufficient color and flavor, if so desired. Adjust the volume of the composition to 5 ml., and mix well.

EXAMPLE 4

The following formulation provides for 1000 tablets containing a combination of therapeutic agents falling within the scope of the invention:

Ingredient: Grams
(1) 10-(2-dimethylaminopropyl) phenothiazine 5-oxide hydrochloride _____ 15.0
(2) d-Amphetamine sulfate _____ 5.0
(3) Methylcellulose _____ 15.0
(4) Lactose U.S.P. _____ 25.0
(5) Corn starch redried _____ 25.0
(6) Magnesium stearate _____ 4.0
(7) Microcel C _____ q.s.

250.0

Thoroughly mix the active ingredients (1) and (2), methylcellulose, lactose, corn starch, Microcel C, and one-half the amount of magnesium stearate. Predensify the mixture by "slugging" on a suitable tablet press. Pass the "slugged" material through a No. 16–20 mesh screen. Add the balance of the magnesium stearate, and mix well. Compress into tablets of 250 mg. each for oral administration.

In a similar fashion, formulations similar to the one above may be prepared wherein 10-(monomethylaminopropyl)phenothiazine 5-oxide and 10-(aminopropyl)phenothiazine 5-oxide have been substituted for the 10-(2-dimethylaminopropyl)phenothiazine 5-oxide indicated as Ingredient (1) in the formulation. Likewise, preparations including methamphetamine sulfate instead of d-amphetamine sulfate may be formulated for oral administration to humans, with equally good results.

EXAMPLE 5

This example demonstrates the antidepressant effect of a representative member of our novel class of therapeutic agents, i.e., 10-(2-dimethylaminopropyl)phenothiazine 5-oxide on test animals (rats). The aforementioned Self-Stimulation Test method is employed. Specifically, in this comparative test the animal gets a brief fixed intensity brain shock each time he presses a certain lever attached to the wall of a box in which he is confined. His rate of manipulation of this lever is an index of the reward value of the stimulation. The stimulating effect of various test drugs is indicated by the number of self-stimulations which the animal seeks. To increase the sensitivity of the animals to test drugs, the current is set near the threshold for reward. This setting leads to a baseline of low response rate which is especially sensitive to the stimulating effect of various test drugs.

The results of this test are tabulated in Table I below where a representative member of the series is tested against well-known antidepressive agents, 5-(3-dimethylaminopropyl) - 10,11 - dihydro-5H-dibenz[b,f]azepine hydrochloride, i.e., commercial antidepressant A, and methamphetamine, i.e., commercial antidepressant B. The baseline consists in a response of the test animals to methamphetamine alone, as well as in combination with Commercial Antidepressant A.

TABLE I
Self-Stimulation Test

| Rat | Exp. No. | Compound | Number of self-stimulations |
|---|---|---|---|
| No. C19 | 1 | Commercial antidepressant B | 399 |
| | 2 | Commercial antidepressant A+B | 1,163 |
| | 3 | 10-(2-dimethylaminopropyl) phenothiazine 5-oxide + B | 1,989 |
| No. E140 | 1 | Commercial antidepressant B | 233 |
| | 2 | Commercial antidepressant A+B | 498 |
| | 3 | 10-(2-dimethylaminopropyl) phenothiazine 5-oxide + B | 1,240 |
| No. C69 | 1 | Commercial antidepressant B | 297 |
| | 2 | 10-(2-dimethylaminopropyl) phenothiazine 5-oxide + B | 1,854 |

In the foregoing test procedure, in Experiment 1 Commercial Antidepressant B is given alone. The test period is standardized at one hour's duration, after the injection. In Experiment 2 Commercial Antidepressant A is given 10 minutes before the test dose of Commercial Antidepressant B. In Experiment 3 the test compound of the invention is injected intraperitoneally into the test animal in a dose which is equimolar to 5 mg./kg. of Commercial Antidepressant A. After 10 minutes' duration a dose of 0.25 mg./kg. of Commercial Antidepressant B is also injected into the rat. It can be seen in summary from the data derived that in Experiment 3 where a preliminary dose of our compound is administered, the self-stimulating action is greatly increased when compared with the action of Commercial Antidepressant B alone. Although these tests are conducted with methamphetamine, it is to be understood that in clinical use as set forth hereinbelow, the novel therapeutic agents alone, or alternatively in combination with an amphetamine such as dextroamphetamine or methamphetamine may be employed.

In addition to the compound 10-(2-dimethylaminopropyl)phenothiazine 5-oxide noted above, specific mention may be made of the compounds 10-(3-dimethylamino-n-propyl)phenothiazine 5-oxide and 10-(3-dimethylaminopropyl)phenothiazine 5,5-dioxide which have also been found to be highly active when subjected to the Self-Stimulation Test elaborated above.

EXAMPLE 6

In a second test of the antidepressive effect of our novel therapeutic agents on animals referred to above as the Automatic Threshold Method, the test animal is placed in a two-lever compartment. When the animal presses Lever A he is given brain shocks which diminish stepwise in intensity. When the current is diminished to an unsatisfactory level, the animal can reset the current by operating a second lever, B. He will then responsively return to the first lever, A, to begin the next cycle of stimulation as before. A continuous record of the relative intensity of current before reset is kept and recorded on the kymograph, as illustrated by the various plates shown in the drawing. The plate indicated as FIG. 1 shows the control record from the kymograph chart, with the animal being tested under no drug influence. The plate indicated by FIGS. 2 and 2A shows the drop in baseline when the test animal is under the influence of methamphetamine alone. The lowering of the baseline following the injection of the drug indicates the animal being tested is willing to accept a lower intensity "reward" before resetting, due to the drug administered. Therefore, the lower and more prolonged the current level before the animal resets, the more active the drug. Plate indicated by FIGS. 3 and 3A demonstrates a greater and more prolonged effect of methamphetamine if 5-(3-dimethylaminopropyl) - 10,11 - dihydro-5H-dibenz[b,f]azepine hydrochloride is administered first as a potentiator. Plates indicated by FIGS. 4 and 4A and 5 and 5A respectively show in two separate tests the unexpectedly high acceptance by the test animals of low intensity current "reward" after treatment with a potentiating dose of 5 mg./kg. of our novel antidepressant agent prior to administration of a 1 mg./kg. dose of methamphetamine. All of the testing and data recorded is obtained over a period of several hours. The test results are graphically presented for test animal A63, although it must be understood that at least 12 other animals were tested, and good activity as indicated by this test was also found. The numbers and reference points positioned along the left hand border of each plate refer to the intensity of current for each impulse recorded on the kymograph scale. The point marked X in the drawing indicates in each plate the point in each experiment where the drug tested was administered to the animal, while the point marked with M indicates in each plate the point at which the methamphetamine was added.

EXAMPLE 7

Clinical evaluation

The following is a typical history of a patient who has received a daily dose of from 15 mg. t.i.d. to 15 mg. q.i.d. of 10-(2-dimethylaminopropyl)phenothiazine 5-oxide for a total of seven days.

He is a 47 year old white married male who has experienced clear cut symptoms of both anxiety and depression for a period of 30 years, and has been under treatment for about 3 years. His diagnosis is psychoneurosis, mixed type, with anxiety and depression predominating. His I.Q. is 114 and he is physically healthy. In the past he has responded to Dexedrine, dosage range from 4 to 20 mg. per day, but he has not responded to amine oxidase inhibitors or to sedation. His profile at the end of seven days was in the form of a change of affective reaction from depressed to cheerful. He was maintained on a dosage schedule of 15 mg. q.i.d. without side effects. Within seven days from the onset of treatment the patient experienced a feeling of mood elevation, and appears to have renewed interest in his occupation and surroundings and to experience a feeling of well-being.

EXAMPLE 8

In addition to the above test data, the following data obtained from the Self-Stimulation Test described above further illustrate the activity of our novel compositions:

| Experiment | Test compound | Self-stimulation/1 hour |
|---|---|---|
| A-1 | (a) 10-(3)-dimethylaminopropyl)phenothiazine 5-oxide+d-methamphetamine hydrochloride. | 2,043 |
|  | (b) d-Methamphetamine hydrochloride. | 664 |
| A-2 | (a) 10.(3)-dimethylaminopropyl)phenothiazine 5-oxide+d-methamphetamine hydrochloride. | 2,380 |
|  | (b) d-Methamphetamine hydrochloride. | 512 |
| B-1 | (a) 10-(3-dimethylaminopropyl)phenothiazine 5,5-dioxide+d-methamphetamine hydrochloride. | 1,856 |
|  | (b) d-Methamphetamine hydrochloride. | 937 |
| B-2 | (a) 10-(3-dimethylaminopropyl)phenothiazine 5,5-dioxide+d-methamphetamine hydrochloride. | 1935 |
|  | (b) d-Methamphetamine hydrochloride. | 606 |

The conditions of test are comparable to those described above. Although we have selected amphetamines such as methamphetamine and the like as the phenethylamines capable of being potentiated by our novel compounds, it is to be understood that any central nervous system stimulating phenethylamine type compound is considered a full equivalent thereof and may likewise be employed within the broad concept of our invention without restriction.

One may specifically consider in this respect N,α,α-trimethylphenethylamine and methyl α-phenyl-2-piperidineacetate.

Other may practice the invention in any of the numerous ways suggested by this disclosure to a routineer versed in the art. All such practice, particularly that falling within the scope of the appended claims or the equivalents, are considered to be a part of our invention.

We claim:

1. An antidepressant composition in unit dosage form comprising a major quantity of a pharmaceutical carrier and a pharmaceutically effective dose of a compound selected from the group consisting of compounds of the formula:

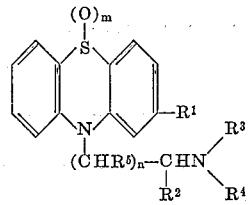

and the pharmaceutically acceptable non-toxic acid addition salt thereof, wherein $R^1$ represents a substituent selected from the group consisting of hydrogen, halogen, trifluoromethyl, and lower alkanoyl; $R^2$, $R^3$, $R^4$, and $R^5$ each represent a substitutent selected from the group consisting of hydrogen and lower alkyl; and $n$ and $m$ each represents a whole integer selected from the group consisting of 1 and 2; and an amphetamine selected from the group consisting of methamphetamine, d-amphetamine, and their pharmaceutically acceptable salts.

2. A method for relieving depression in a human which comprises administering to a human a pharmaceutically effective dose of a composition comprising a phenothiazine selected from the group consisting of those of the formula:

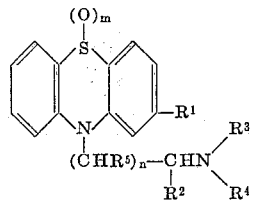

and the pharmaceutically acceptable non-toxic acid addition salt thereof, wherein $R^1$ represents a substitent selected from the group consisting of hydrogen, halogen, trifluoromethyl, and lower alkanoyl; $R^2$, $R^3$, $R^4$, and $R^5$ each represent a substituent selected from the group consisting of hydrogen and lower alkyl; and $n$ and $m$ each represent a whole integer selected from the group consisting of 1 and 2; a pharmaceutically acceptable carrier; and an amphetamine selected from the group consisting of methamphetamine, d-amphetamine, and their pharmaceutically acceptable salts.

3. A method for relieving depression in a human which comprises administering to a human a pharmaceutically effective dose of a composition comprising 10-(2-dimethylaminopropyl) phenothiazine-5-oxide and an amphetamine selected from the group consisting of methamphetamine, d-amphetamine and their pharmaceutically acceptable salts.

References Cited by the Examiner

UNITED STATES PATENTS

| 2,629,719 | 2/1953 | Cusic | 260—243 |
| 2,687,414 | 8/1954 | Cusic | 260—243 |
| 2,837,518 | 6/1958 | Jacob | 260—243 |
| 3,023,146 | 2/1962 | Tislow | 167—65 |

FOREIGN PATENTS

| 797,628 | 7/1956 | Great Britain. |
| 813,861 | 5/1959 | Great Britain. |

OTHER REFERENCES

Overall: J.A.M.A., vol. 189, No. 8, Aug. 1964 pages 605–608.

JULIAN S. LEVITT, *Primary Examiner.*

MORRIS O. WOLK, LEWIS GOTTS, *Examiners.*